April 22, 1924.

F. F. MARQUARD ET AL

EVAPORATING APPARATUS

Original Filed Nov. 11, 1920   2 Sheets-Sheet 2

1,491,486

Witnesses:
Edwin Trueb

Inventors:
F. F. MARQUARD, and
C. W. LITTLER
by D. Anthony Usina
their Attorney.

Patented Apr. 22, 1924.

1,491,486

UNITED STATES PATENT OFFICE.

FRANK F. MARQUARD, OF CLAIRTON, AND CARL W. LITTLER, OF SWISSVALE, PENNSYLVANIA.

EVAPORATING APPARATUS.

Original application filed November 11, 1920, Serial No. 423,288. Divided and this application filed December 30, 1921. Serial No. 525,937.

*To all whom it may concern:*

Be it known that we, FRANK F. MARQUARD and CARL W. LITTLER, both citizens of the United States, and residents, respectively, of Clairton and Swissvale, both in the county of Allegheny and State of Pennsylvania, have invented certain new and useful Improvements in Evaporating Apparatus, of which the following is a specification.

This invention relates to the recovery of soluble salts from liquids containing the same in solution, and more particularly relates to apparatus adapted to carry out the method for recovering ammonium chloride and other similar soluble salts from ammonia liquor, derived from the operation of by-product coke plants, as described and claimed in our co-pending application Serial No. 423,288, filed November 11, 1920, of which this a division.

A particular object of this invention is to either evaporate the liquor entirely, or to concentrate the fixed liquor to a saturated solution for the purpose of recovering ammonium chloride, calcium chloride, or similar soluble salts.

The apparatus or plant constructed according to our invention will comprise a furnace and evaporating tower having a basin at its lower end, and the liquors will be circulated from the basin into the top of the tower and allowed to fall against a forced counter-flow of the products of combustion. The liquor during its continued and repeated circulation through the tower will give up all water and soluble tar vapors to the forced draft of products of combustion and become either evaporated entirely or circulated until it reaches the point of saturation when the salts will be precipitated in the solution which is held in the basin at the lower end of the tower.

The above apparatus and method will produce an economy in heat requirements, purification of liquor by aeration, and many other advantages that will be more fully set forth in the following description.

Another important advantage of the present construction of apparatus is that it may be built entirely of non-corrosive materials, thereby eliminating the disadvantages resulting from the corrosive action of the liquors treated.

Another object of the present invention is to construct an apparatus having manholes to facilitate the removal of the salts formed therein, and the tar or other foreign substances contained in the crude liquors.

In the accompanying drawings, Figure 1 is a somewhat diagrammatic sectional side elevation of a complete apparatus.

Figure 1$^a$ is to be joined to Figure 1 on the line X—X to form a complete sectional elevation.

Figure 1:
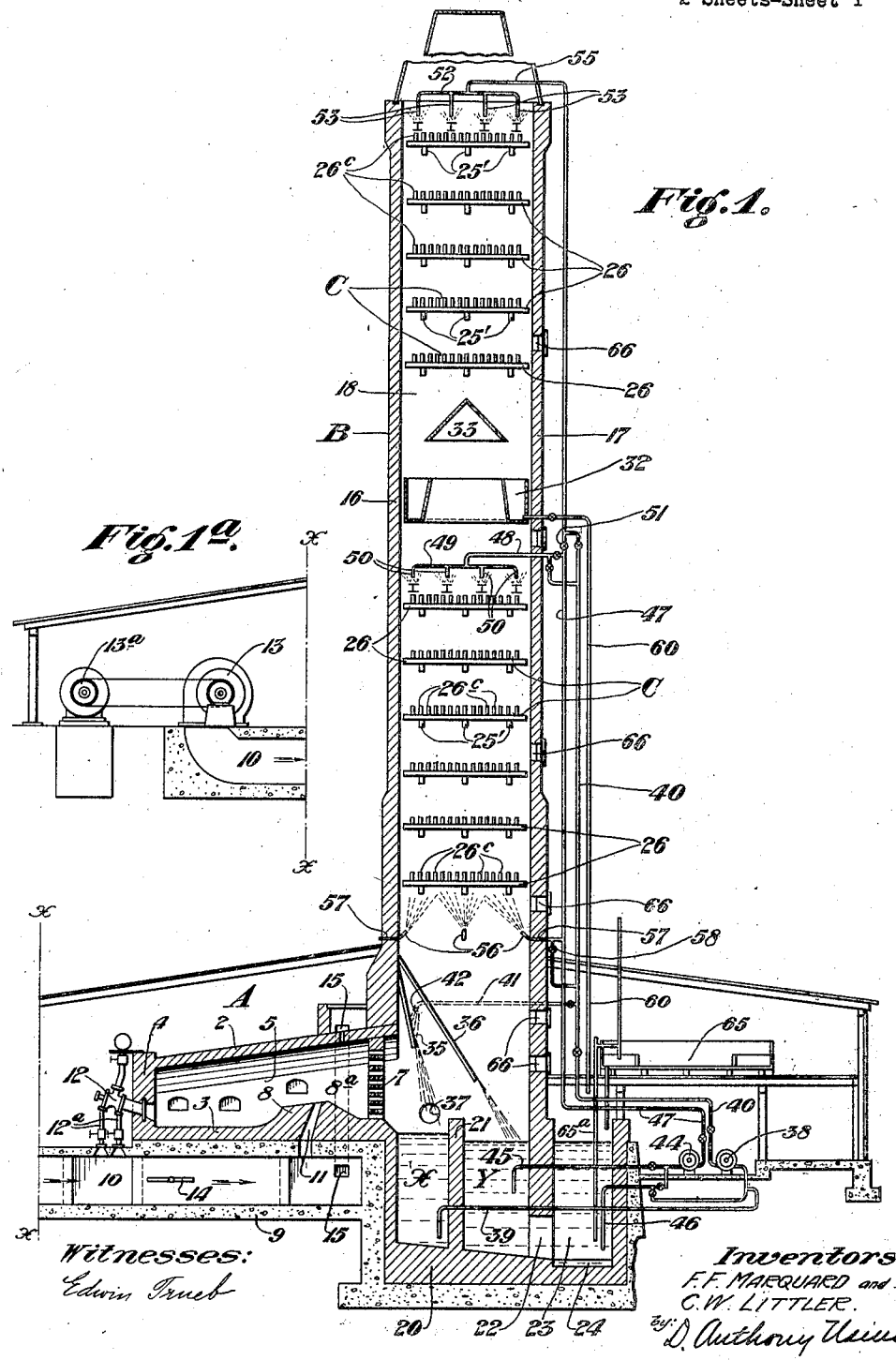
Figure 2:
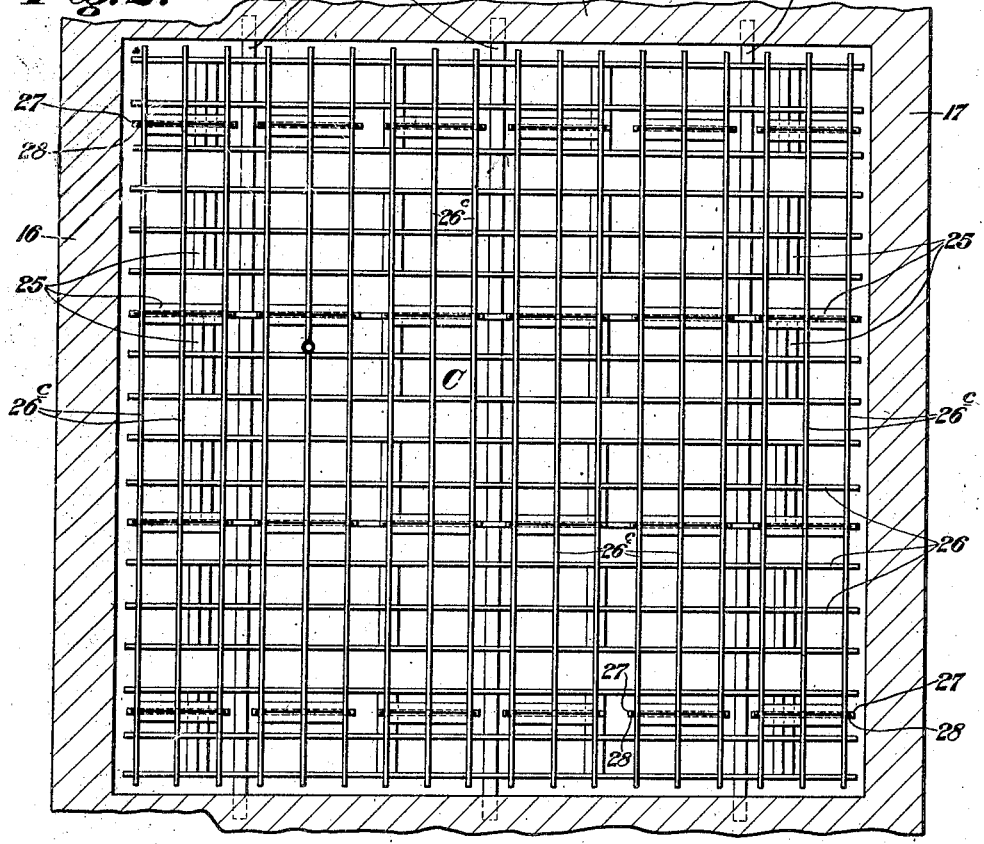
Figure 2 is an enlarged cross-sectional view of the tower showing one of the banks of baffles in position.
Figure 3:
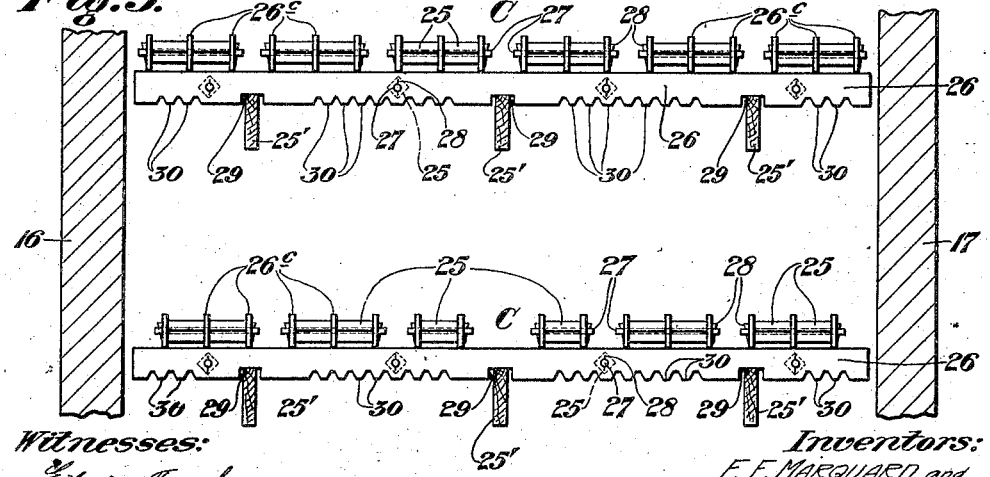
Figure 3 is an enlarged fragmentary side elevation showing several banks of baffles.

Referring particularly to the drawings, the letter A designates the furnace as a whole, and the letter B designates the tower. The furnace and tower are preferably formed from brick and are built integral, the tower serving as a flue or stack for the furnace.

The furnace A is of ordinary construction and is composed of top and bottom walls 2 and 3, front wall 4, and side walls 5. A checker-wall 7 is arranged within the furnace adjacent its rear end, and a fire-wall 8 is arranged immediately forward of the checker-wall 7. The fire-wall 8 is of considerable depth and spaced from the top wall 2 forming a passage 8$^a$ for the products of combustion and forced draft, which pass onward through the checker-wall 7 and into the tower B.

A concrete base 9 is provided for the furnace A and tower B. The furnace portion of the base extends a considerable distance beyond the furnace A, and is formed hollow so as to provide an air duct 10, which has its forward end in communication with a blower 13 driven by a suitable motor 13$^a$. Suitable air conduits 11 are formed in the fire-wall 8 and have their lower ends opening into the air duct 10 to supply a forced draft.

Any suitable fuel may be used to fire the furnace A, although gas is the preferred fuel, and therefore, a gas burner 12 has been shown communicating through the front wall 4 with the interior of the furnace, and having air supply tubes 12$^a$ extending downward and communicating with air duct 10, A damper 14 is provided in the air duct 10 to regulate the flow of air to the air conduits 11, and a secondary air duct 15 is provided to admit air to the rear of the duct 10 if desired or necessary.

The tower B comprises front and back walls 16 and 17 and side walls 18 and 19, and a bottom wall 20, and extends a considerable distance below the furnace A to provide a basin for the reception of the liquor being evaporated. The basin or lower portion of the tower is divided into two parts or chambers X and Y by a transverse wall 21 for the reception of liquids of different qualities.

The back wall 17 has a cutaway portion at its bottom forming an outlet 22 opening into a settling chamber or basin 23, which is provided with a depression 24 in its bottom so as to allow for complete drainage of all liquid.

Spaced at intervals along the length of the tower from a point considerably above the top of the furnace, are a plurality of baffle supports 25, which are composed of wood or other non-corrosive material. The supports 25′ are spaced so as to form upper and lower units or groups, and each support is mounted rigidly in the side walls of the tower to support suitable baffles C.

The baffles C are composed of bottom and top layers or sections 26ᶜ, each section being composed of a plurality of slats 26 set edgewise and spaced by separators or spacers 25, and held together by suitable pins 27 which pass through the slats and separators and have wedges 28 passing through their ends to bind the parts together. The under sides of the slats 26 are notched at 29 to fit over the supports 25′, and further cut away to form a plurality of drip points 30.

The sections 26ᶜ forming the lower layer are supported directly upon the supports 25′, and the slats extend at right angles to said supports, while the sections 26ᶜ of the top layer are supported on the lower sections and extend the opposite direction or at right angles to the sections of the bottom layer, thereby forming a checker-like baffle.

The baffles C are composed completely of wood or other non-corrosive material.

The liquor which is treated in the upper portion of the tower and which will fall or be sprayed over the upper unit or group of baffles is of different quality than that to be treated in the lower portion, and therefore, is caught before it falls onto the lower unit or group of baffles in an annular trough 32. A suitable cone-shaped shield 33 is arranged centrally within the tower and spaced above the trough 32, and has its lower edges overlying the inner edge of the trough so as to direct the liquor into the trough.

A deflecting shield or baffle plate 35 is secured to the front wall 16 of the tower, slightly above the furnace A, and extends downwardly and inwardly on an angle, so as to deflect a spray of liquor in sheet formation past the mouth of the furnace A and into the chamber X of the tower, thereby preventing the volatilization of the ammonium chloride, and further providing a means of regulating the temperature of the gases entering the stack by spraying different quantities of liquor onto the deflecting shield or baffle plate.

A second shield or baffle plate 36 is secured above the shield 35 and extends inwardly and downwardly on a greater angle than the shield 35 so as to overlie the same and receive and direct the liquor falling from the baffles C and direct it into the chamber Y of the tower.

The liquor to be treated, which is termed weak liquor, enters the chamber X of the tower A through a suitable inlet 37 and is drawn from the chamber X by a pump 38 having an inlet pipe 39 communicating with the chamber. The pump 38 forces the weak liquor upwardly through a main 40 running parallel with the rear wall of the tower. A suitable branch pipe 41 is connected with the pipe 40 and is provided with a nozzle 42 to provide a spray of weak liquor against the shield 35.

A suitable pump 44 having inlet pipes 45 and 46 communicating with the chamber Y and settling basin 23, respectively, is provided to draw the saturated or already treated liquor from the chamber Y and settling basin 23, and to force said liquor upwardly through a main 47 which extends the entire height and parallel with the tower.

A suitable valved branch connection 48 leads from both of the mains 40 and 47 to a suitable manifold distributor 49, having a plurality of sprays 50 adapted to spray liquor over the lower unit of baffles.

The main 40 is connected with the main 47 at a point above the branch 48, and the main 47 is provided with a valve 51 below this connection so that the flow of liquor from pump 44 will normally be shut from this portion of the main.

A second manifold distributor 52 having a plurality of sprays 53 is provided to spray liquor from the top of the tower over the upper unit of baffles. The manifold distributor is connected with the upper end of main 47 by a branch 55.

At a point below the lowermost baffle C, or in the hot zone, a plurality of spray nozzles 56 extend through the walls of the tower. Nozzles 56 are connected to a supply pipe 57 which is connected to the mains 40 and 47 by suitable valved connections 58, and are adapted to normally take their supply from the main 47, thereby spraying saturated liquor into the products of combustion and against the lower baffles, to protect said baffles against disintegration due to overheating, and such spray also serving to further condense the liquor.

The spraying of weak liquor through the sprays 53 serves to condense the liquor, and also to wash down any traces of ammonium chloride in the form of salt carried up mechanically by outgoing vapors and the products of combustion. The condensed liquor and salts from the upper unit of baffles falls into the trough 32 and is conveyed by a main 60 downward into the settling basin 23.

A suitable salt ejector 65ª and salt box 65 is arranged above the settling chamber 23 to remove the salt therefrom. Any suitable form of apparatus may be used for this purpose. Therefore, an ordinary form of apparatus has been diagrammatically illustrated.

A plurality of manholes 66 are provided in the back wall 17 of the tower to provide ready access to the interior of the tower, for removal of the collected and formed salts or to make repairs or adjustments.

According to our method a quantity of raw or weak liquor is admitted to the chamber X of the tower B, through the inlet 37. The pump 38 is then set in operation to draw the liquor from this chamber and force it upwardly through the main 40.

The valved connections 48 and 58 are adjusted so that liquor from the main 40 will flow therethrough and into the sprays 50 and nozzles 56, respectively. The nozzle 42 is connected at all times with the main 40 through a branch 41, thereby providing a spray of raw or weak liquor against the shield 35. The valve 51 in the main 47 is normally closed and the main 40 is in open communication with the main 47. Therefore the upper portion of main 47 will convey a weak liquor to the manifold chamber 52 and sprays 53.

The furnace A is fired when the pump 38 is started, thereby producing a quantity of hot gases which will pass through into the tower B and rise to meet the down coming liquor. Air is forced through the air duct 10 and inlets 11 while the furnace is in operation, thereby creating a draft to force the products of combustion and hot gases up through the tower B.

The liquor being sprayed into the tower through the sprays 50 and nozzles 56, will fall onto the shield 36 and be directed into the chamber Y, while the liquor sprayed through the sprays 53 will fall over the upper unit of baffles and into the trough 32 from which it will be conducted into the settling basin 23.

As the liquor is sprayed into the tower it must fall against the counter-current of hot gases, which cause it to give up its water and soluble tar vapors, forming a concentrated solution and salt crystals.

As the chamber Y becomes sufficiently filled with concentrated and salt ladened liquor, the pump 44 is started in motion to force the concentrated and salt ladened liquor into the main 47, and the valved connections 48 and 58 are adjusted so that the nozzles 56 will receive their supply entirely from the main 47, and the sprays 50 will receive a mixed supply from both mains 40 and 47.

The apparatus will then re-circulate the liquid from the chamber Y and settling tank 23 until the desired degree of saturation is obtained, and at the same time continually draw raw or weak liquor from the chamber X by means of the pump 38 which will force it through the mains 40 and upper portion of main 47, such liquor being mixed with the saturated liquor from main 47, in the sprays 50, and being fed exclusively through the sprays 53. The liquor from the sprays 53 is concentrated as it falls over the baffles C in the upper unit, and also is saturated with salt crystals carried upwardly mechanically by the hot gases and is, therefore, conducted directly into the settling chamber 23.

As the liquors become saturated, the salts are removed in any desired manner from the settling basin 23, preferably the ejector 65ª will be employed to force the salts into the salt box 65.

The above method requires less heat, causes a more efficient purification of the liquors by aeration, and concentrates the liquors to the desired degree in less time than any method employed or known heretofore.

We claim—

1. An evaporating plant for ammonia liquor comprising a tower composed of non-corrodible material, said tower having an inlet at a point materially above its bottom for hot gases, a plurality of chambers formed in the lower portion of said tower below said inlet for the retention of the liquor to be evaporated, a plurality of non-corrosive baffles extending transversely at spaced intervals within said tower above said inlet, a plurality of spraying nozzles within said tower, means for forcing the liquid to be evaporated from said chambers through said nozzles, some of said nozzles being arranged to direct a spray of liquid downwardly over said baffles, other of said nozzles being arranged to direct a spray of said liquid upwardly against the lowermost of said baffles, and still other of said nozzles being arranged to direct a sheet-like spray of said liquid downwardly over said inlet to control the flow of hot gases therethrough.

2. An evaporating plant for ammonia liquor, comprising a tower composed of non-corrosive material, said tower having an inlet at a point materially above its bottom for hot gases, a plurality of chambers for the retention of liquors of different qualities to be evaporated, upper and lower series of non-corrosive baffles extending transversely at spaced intervals within said tower above said inlet, a plurality of spraying nozzles within said tower, means for circulating the liquor from said chambers upwardly through said nozzles, and means above said lower series of baffles for trapping the liquor passing over said upper series of baffles, some of said nozzles being arranged above said upper series of baffles and others of said nozzles being arranged above said lower series of baffles so as to direct a spray of liquor downwardly over said baffles, other of said nozzles being arranged to direct a spray of liquor upwardly against the lowermost of said baffles, and still other of said nozzles being arranged to direct a flat sheet-like spray of liquor downwardly over said inlet to control the flow of hot gases therethrough.

3. An evaporating plant for ammonia liquor, comprising a tower composed of non-corrosive material, said tower having an inlet at a point materially above its bottom for hot gases, a plurality of chambers for the retention of liquors of different qualities to be evaporated, upper and lower series of non-corrosive baffles extending transversely at spaced intervals within said tower above said inlet, a plurality of spraying nozzles within said tower, means for circulating the liquor from said chambers upwardly through said nozzles, and means above said lower series of baffles for trapping the liquor passing over said uper series of baffles, some of said nozzles being arranged above said upper series of baffles and others of said nozzles being arranged above said lower series of baffles so as to direct a spray of liquor downwardly over said baffles, and other of said nozzles being arranged to direct a spray of liquor upwardly against the lowermost of said baffles.

4. An evaporating plant for ammonia liquor, comprising a tower composed of non-corrosive material, said tower having an inlet at a point materially above its bottom for hot gases, a plurality of chambers for the retention of liquors of different qualities to be evaporated, an upper and lower series of non-corrosive baffles extending transversely at spaced intervals within said tower, above said inlet, a plurality of spraying nozzles within said tower, means for circulating the liquor from said chambers upwardly through said nozzles, and means above said lower series of baffles for trapping the liquor passing over said upper series of baffles and returning it to one of said chambers, some of said nozzles being arranged above said upper series of baffles and others of said nozzles being arranged above said lower series of baffles so as to direct a spray of liquor downwardly over said baffles, other of said nozzles being arranged to direct a spray of liquor upwardly against the lowermost of said baffles, an inclined baffle plate secured to the wall of said tower above said inlet, and at least one of said nozzles being arranged to direct a spray of liquor against said last named baffle plate to form a flat sheet-like spray past said inlet to thereby control the flow of hot gases therethrough.

In witness whereof, we have hereunto signed our names.

FRANK F. MARQUARD.
CARL W. LITTLER.